UNITED STATES PATENT OFFICE.

WILLIAM HARROLD SMITH, OF NEW YORK, N. Y.

IMPROVEMENT IN CONCRETE PAVEMENTS.

Specification forming part of Letters Patent No. 122,497, dated January 2, 1872.

*To all whom it may concern:*

Be it known that I, WILLIAM HARROLD SMITH, of the city, county, and State of New York, have made new and useful Improvements in Concrete for Pavements and other purposes; and I do hereby declare the following to be a full, clear, and exact description of the same.

In an application filed by me contemporaneously herewith for Letters Patent of the United States I have described certain improved machinery and appliances for manufacturing and mixing concretes for pavements, buildings, and other purposes, conveying it from the machine to the place where it is to be laid or used, and suitably laying or casting it in molds or otherwise to the required form. By reference to the specification filed therewith it will appear that such apparatus is specially adapted to the manufacture and use of a liquid or semi-liquid concrete composition which can be conveyed through pipes and cast in molds. No concrete composition has ever been brought into public use for the purposes referred to which is capable of being thus manipulated; nor has it been deemed practicable to attempt to invent a composition sufficiently liquid to flow freely through pipes and yet able to set quickly upon reaching its destination, so as to form in a very short time a solid mass of artificial stone. Such a composition, however, I have discovered, and have proved, by a thorough course of experiments and trials, its complete fitness for the purposes and the great practical utility of its application in the manner referred to. So far, therefore, as relates to this division of the subject-matter contained in my several applications for Letters Patent, my invention consists in a composition prepared substantially as hereinafter described, so as to be capable of use in a fluid or semi-fluid condition, for the purposes specified.

I take any good hydraulic cement, preferably Portland cement, and sand, gravel, or some equivalent of sand or gravel, such as broken shells, slag, etc., and mix them together in about equal proportions by specific weight. This mixing may be accomplished by any suitable means, but preferably by the machine described in my other application above referred to. To the mixture of cement and sand, in the proportion of two parts, by weight, I add three parts, by weight, of broken stone, using therefor any of the varieties of stone suitable for the purpose, such as blue-stone, quartz, the ordinary cobble-stones employed for paving purposes, granite, &c. I then add a quantity of water equal to about three-fifths of the entire mass of materials already commingled, and agitate the mixture thoroughly by mechanical means until the whole is of a fluid character, capable of flowing freely through pipes and of being run into covered molds. It is then ready for use.

It will be seen from what I have stated that the materials employed by me in making this improved composition are old, every one of them having been used for many years. My invention does not consist in being the first to combine such materials, but in being the first to combine them for the arts in such proportions that a liquid or semi-liquid mass results which can be flowed through pipes and run into covered molds, and which can be made and used in laying pavements, building houses and other structures, etc., by means of the improved machinery described in my said accompanying application.

I do not claim to cover a pasty mass which can be pressed into blocks but which will not flow through pipes, the great practical advantage of my improvement being the adaptation of the material to a new method of conveying and laying it for the purposes set forth.

The proportions above stated may be varied within certain limits without departing from the spirit of my invention. However they may be varied, so long as the result is a composition which will flow through pipes or run into molds, it comes within the scope of my claims. Indeed, with certain species of stone of different specific gravities, the proportions of sand, water, and cement must necessarily be slightly varied. The heavier the stone the more dense must be the surrounding liquid in order to sustain it. The broken stone must be held uniformly diffused throughout the mass, and the liquid, while thin enough to flow even with the stones intermingled, must be thick enough or have tenacity enough to keep the stones from settling to the bottom. In the perfect adjustment of these conditions consists the great secret of my success.

So far as concerns the process of laying pavements and building up walls by carrying the materials in a liquid form in tubes and discharging it therefrom into molds which keep it in the required position until it is set, such process is claimed in my contemporaneous application and constitutes no part of this. Such process is applicable to all compositions, however made and whether yet discovered or not, that can be conveyed in pipes.

Having thus described my invention, what I claim is—

The paving or building composition herein described, when prepared for use in a liquid or semi-liquid condition, capable of flowing in pipes and running into molds, substantially as described.

W. HARROLD SMITH.

Witnesses:
NATHAN K. ELLSWORTH,
MELVILLE CHURCH.